(12) United States Patent
Yu et al.

(10) Patent No.: US 7,222,925 B2
(45) Date of Patent: May 29, 2007

(54) ADJUSTABLE WALL-MOUNTED INFORMATION APPLIANCE ASSEMBLY

(75) Inventors: Shu Hui Yu, Tu-Chen (TW); Cheng Kuang Chung, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 293 days.

(21) Appl. No.: 10/948,532

(22) Filed: Sep. 22, 2004

(65) Prior Publication Data
US 2005/0116590 A1  Jun. 2, 2005

(30) Foreign Application Priority Data
Dec. 2, 2003   (TW)  .............................. 92221217 U

(51) Int. Cl.
  *A47B 67/02*   (2006.01)
(52) U.S. Cl. .................... 312/245; 312/223.1; 411/510
(58) Field of Classification Search .................. 24/453, 24/457, 458; 411/508, 509, 510, 913; 248/222.41, 248/222.51, 222.52; 312/223.1, 245
See application file for complete search history.

(56) References Cited

U.S. PATENT DOCUMENTS

| | | | | |
|---|---|---|---|---|
| 3,343,719 A | * | 9/1967 | Kastamo et al. ............... 222/1 |
| 3,575,288 A | * | 4/1971 | Brucken ...................... 206/320 |
| 4,223,861 A | * | 9/1980 | Guggemos et al. .... 248/222.52 |
| 4,527,760 A | * | 7/1985 | Salacuse ...................... 248/108 |
| 4,807,947 A | * | 2/1989 | Nuzzo ...................... 312/140.4 |
| 5,207,546 A | * | 5/1993 | Bouverie ...................... 411/553 |
| 5,233,731 A | * | 8/1993 | Phillips ........................ 24/297 |
| 5,326,061 A | * | 7/1994 | Hamilton ..................... 248/239 |
| 6,520,704 B1 | * | 2/2003 | Vidmar et al. .............. 403/188 |
| 6,575,895 B1 | * | 6/2003 | Blair ........................... 600/27 |
| D511,676 S | * | 11/2005 | Chung et al. ................ D8/355 |

FOREIGN PATENT DOCUMENTS

TW    537477    6/2003

* cited by examiner

*Primary Examiner*—Janet M. Wilkens
(74) *Attorney, Agent, or Firm*—Wei Te Chung

(57) ABSTRACT

A wall-mounted information appliance assembly includes an information appliance (10) defining a recess (132) therein, a pivot base (30), and a screw (40). The recess includes a plurality of spaced indents. A plurality of spaced projecting portions (33) is formed on the pivot base, and the projecting portions are partly engaged in the recess. Each projecting portion includes at least one tooth (35). The screw is for attaching the pivot base to a wall (50). The information appliance is attached to the pivot base, and is switchable between different attachment orientations with the indents of the information appliance being selectively engaged with the teeth of the pivot base.

18 Claims, 4 Drawing Sheets

ADJUSTABLE WALL-MOUNTED INFORMATION APPLIANCE ASSEMBLY

BACKGROUND OF THE INVENTION

1. Field of the Invention

The present invention relates to an information appliance assembly, and more particularly to a wall-mounted information appliance assembly which enables switching of orientations of an information appliance.

2. Description of the Related Art

With the development of information technology, more and more information appliances are produced to facilitate our home and office life. As we enjoy the convenience of the information appliances, we have to face the problem of limited room relative to diverse information appliances. Therefore, the information appliances are often attached to a wall of a house to save room.

An information appliance, such as an LCD monitor or an LCD TV, is conventionally attached to the wall with a plurality of screws. However, it is boring to unscrew the screws before taking off the information appliance.

To address the aforesaid problem, Taiwan Patent No. 537477 discloses a mechanism to attach an information appliance to a wall. The mechanism comprises a first bracket adapted for being fixed to the wall, and a second bracket adapted for being fixed to a rear of the information appliance. A pair of slots is defined in opposite flanges of the first bracket, and a pair of catches is formed on opposite flanges of the second bracket corresponding to the slots of the first bracket. The information appliance is attached to the wall with the catches engaging in the slots. However, such mechanism can only hold the information appliance in a given orientation. It is impossible to switch attachment orientations of the information appliance according to different orienting needs.

Thus, an information appliance assembly which overcomes the above-mentioned problems is desired.

SUMMARY OF THE INVENTION

Accordingly, an object of the present invention is to provide a wall-mounted information appliance assembly which enables switching orientations of an information appliance.

A further object of the present invention is to provide a wall-mounted information appliance assembly which facilitates attachment and detachment of the information appliance.

To achieve the above objects, an information appliance assembly in accordance with the present invention comprises an information appliance, a pivot base, and a fastener. The information appliance defines a recess in a bottom wall thereof, the recess comprising a plurality of spaced indents in the bottom wall. A plurality of spaced projecting portions is formed on the pivot base, and the projecting portions are at least partly engaged in the recess. Each of the projecting portions comprises at least one tooth. The fastener is for attaching the pivot base to a wall. The information appliance is attached to the pivot base, and is switchable between attachment orientations with the indents of the information appliance being selectively engaged with the teeth of the pivot base.

Other objects, advantages and novel features of the present invention will be drawn from the following detailed description of a preferred embodiment of the present invention with the attached drawings, in which:

DETAILED DESCRIPTION OF THE INVENTION

Figure 1:
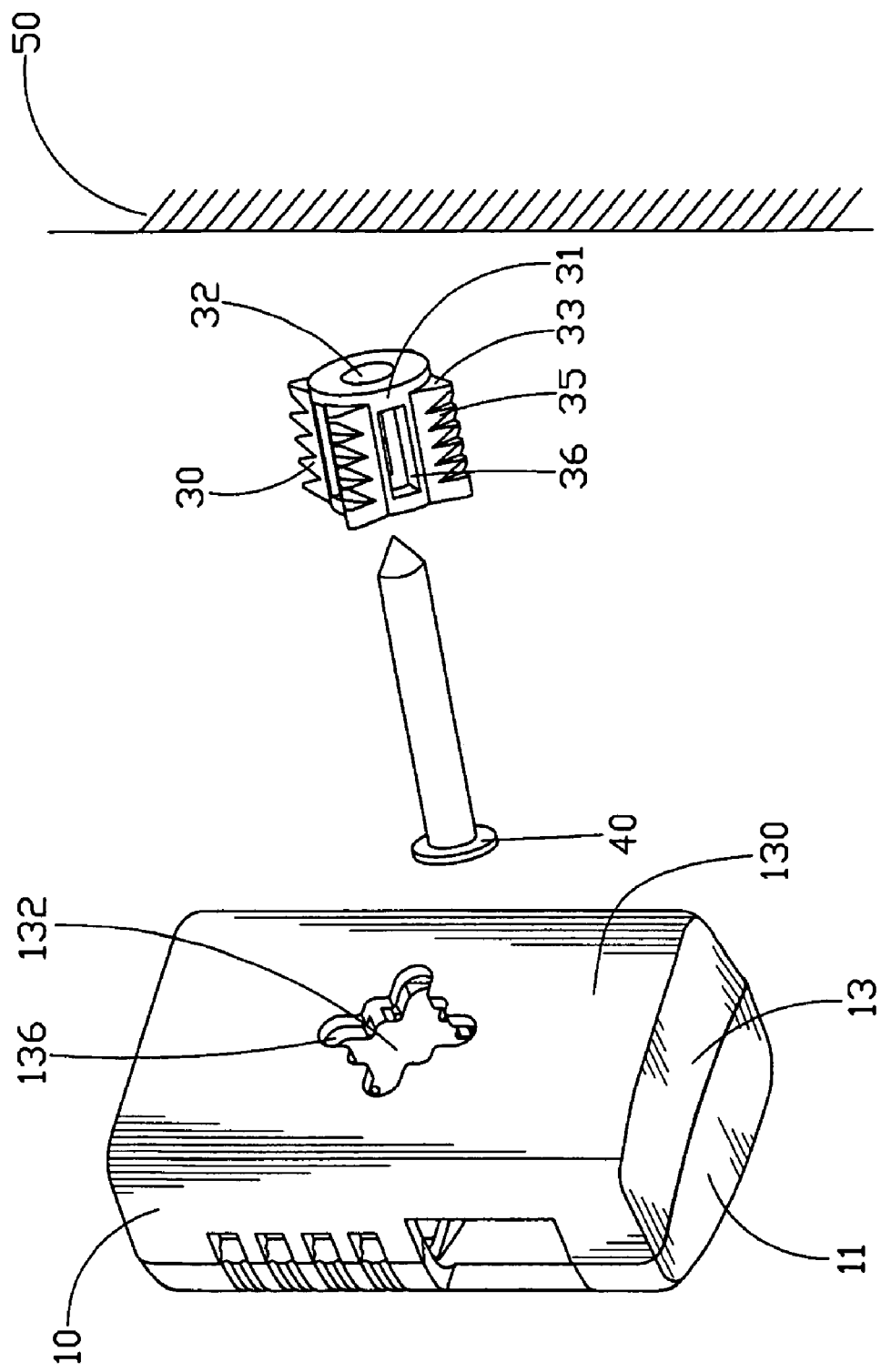
FIG. 1 is an exploded, isometric view of an information appliance assembly in accordance with a preferred embodiment of the invention, the information appliance assembly comprising an information appliance, a pivot base, and a fastener.

Referring to FIG. 1, an information appliance assembly comprises an information appliance 10, a pivot base 30, and a fastener, such as a screw 40. The information appliance assembly is to be attached to a support, such as a wall 50.

Figure 2:
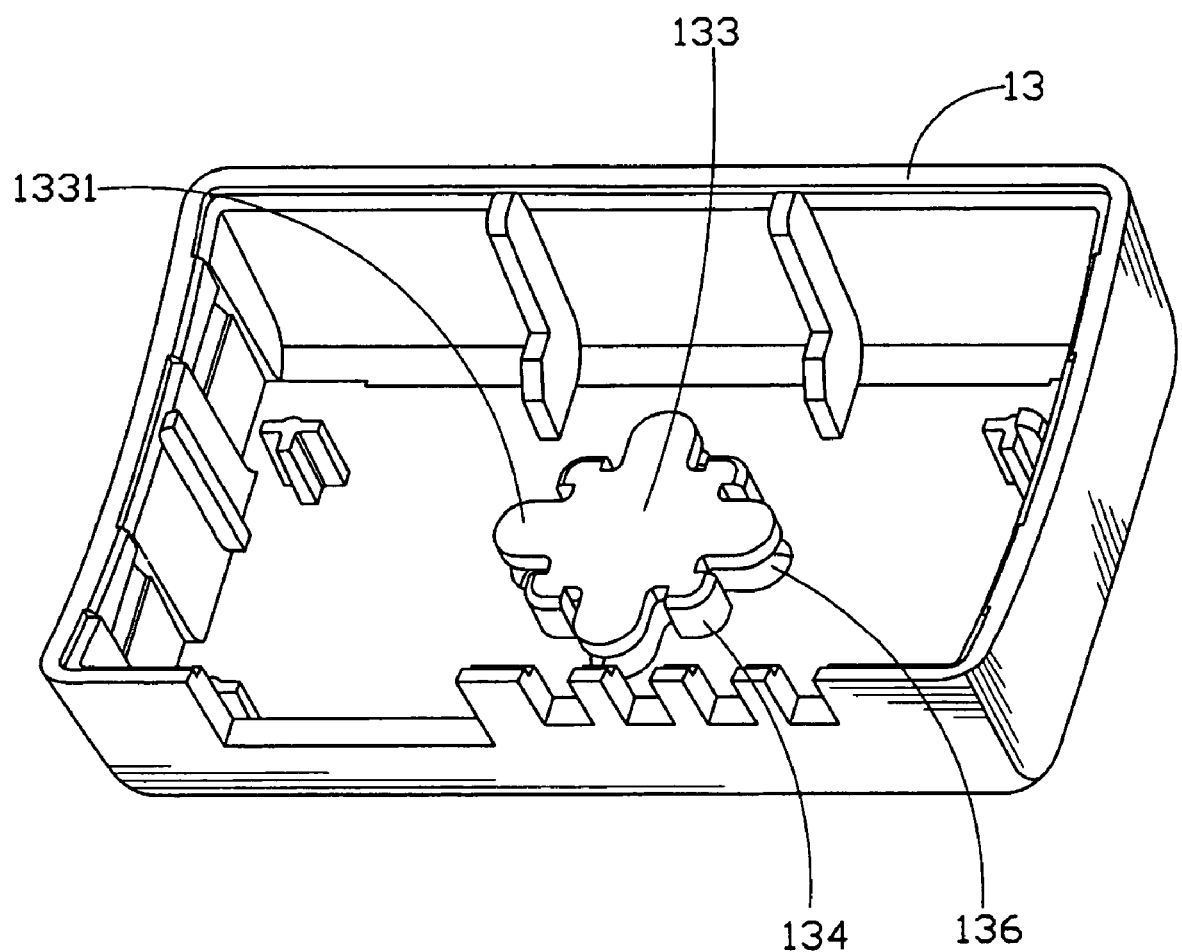
FIG. 2 is an isometric view of a base of the information appliance of FIG. 1.

The information appliance 10 comprises a base 13, and a cover 11. The base 13 comprises a bottom wall 130. Referring to FIG. 2, a recessed panel 133 is formed inside the base 13 in parallel with the bottom wall 130. The recessed panel 133 is generally cross-shaped, and comprises four protrusions 1331. A connecting member 134 is formed from a junction of each two neighboring protrusions 1331 to integrate the recessed panel 133 with the bottom wall 130. A generally cross-shaped recess 132 is defined in the bottom wall 130 at the recessed panel 133, and a contour of the recess 132 corresponds to a contour of the recessed panel 133. That is, the recess 132 comprises four indents (not labeled) at four ends thereof respectively, corresponding to the protrusions 1331 of the recessed panel 133. A gap 136 is defined between each protrusion 1331 and the bottom wall 130.

The pivot base 30 comprises a cylinder portion 31 with a through hole 32 defined therein. The through hole 32 is for extension of the screw 40. Four longitudinal projecting portion 33 are formed around the cylinder portion 31, corresponding to the recess 132 of the information appliance 10. Each projection portion 33 defines a plurality of dents thereby forming a plurality of spaced teeth 35, corresponding to the gaps 136 of the information appliance 10 respectively. The teeth 35 are slanted toward a predetermined direction, for facilitating entry into the recess 132. A plurality of slots 36 is defined in the cylinder portion 31 and in communication with the through hole 32, for providing more flexibility to the pivot base 30. Each slot 36 is defined along an axial direction and between each two neighboring projecting portions 33 respectively.

Figure 3:
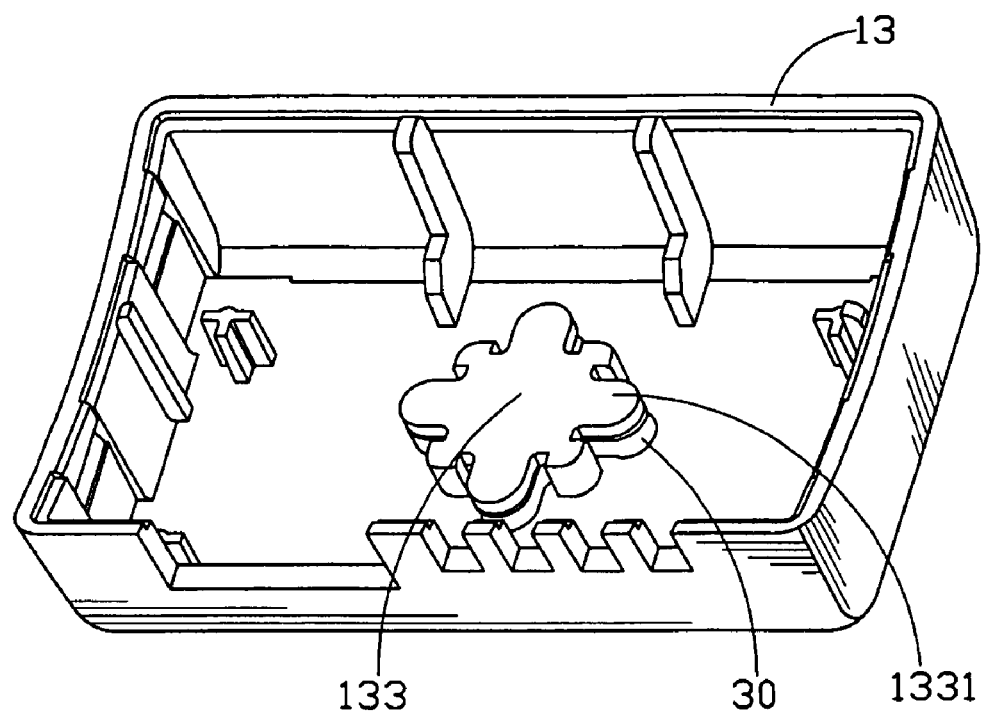
FIG. 3 is a partly assembled view of FIG. 1, showing the pivot base engaging with the base of the information.
Figure 4:
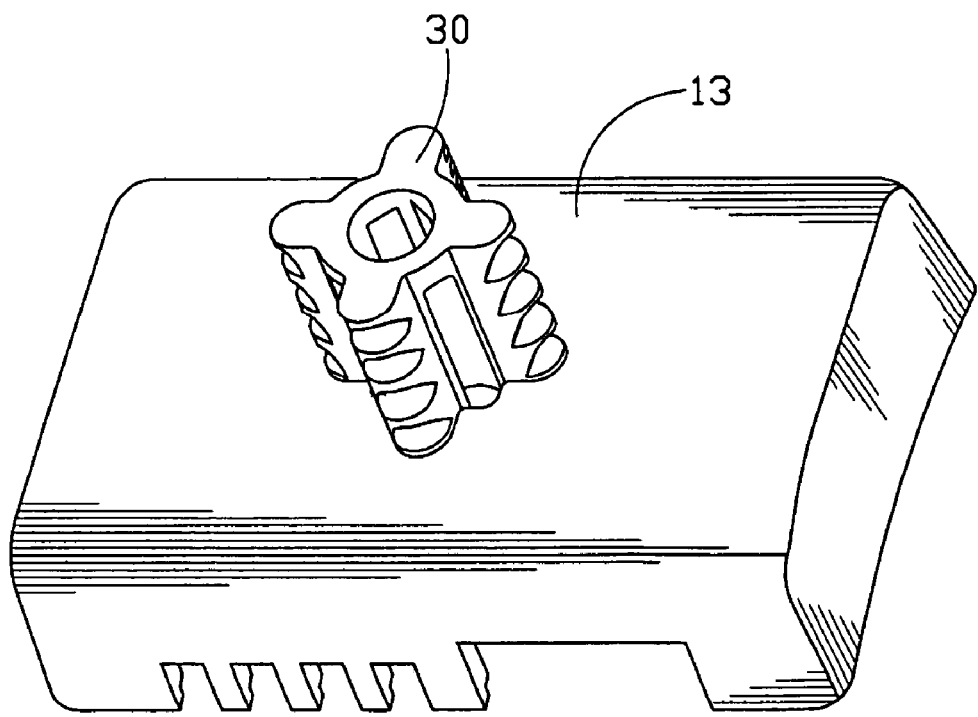
FIG. 4 is similar to FIG. 3, but viewed from another aspect.

FIGS. 3 and 4 show one end of the pivot base 30 is received in the recess 132 of the base 13. First/outmost teeth 35 of the pivot base 30 are accommodated in the gaps 136 of the base 13. The bottom wall 130 is sandwiched between first and second teeth 35 of the pivot base 30.

Figure 5:
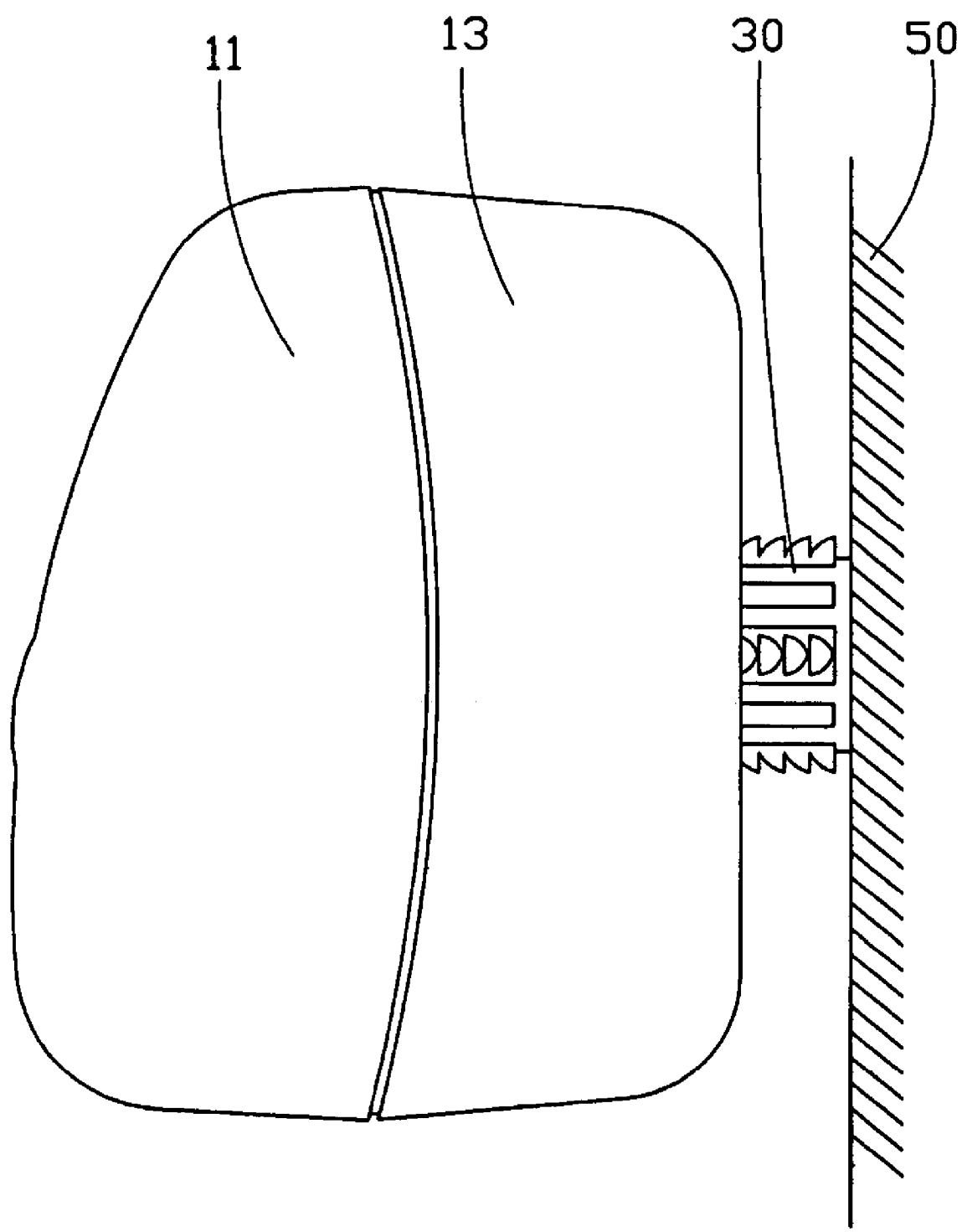
FIG. 5 is a fully assembled view of FIG. 1.

Referring to FIG. 5, in use of the information appliance assembly, the screw 40 is inserted through the through hole 32 and fixes the pivot base 30 to the wall 50. The information appliance 10 is then vertically aligned with and pressed toward the pivot base 30. The end of the pivot base 30 is squeezed into the recess 132 of the information appliance 10. In detail, the first teeth 35 of the pivot base 30 are resiliently deformed to exceed the bottom wall 130, then the first teeth 35 rebound to enter the corresponding gaps 136 of the information appliance 10 respectively. The bottom wall 130 of the information appliance 10 is sandwiched between the first and second teeth 35 of the pivot base 30. The information appliance 10 is thus attached to the wall 50. In detaching the information appliance 10 from the pivot base 30, the information appliance 10 is pulled away from the pivot base 30, the first teeth 35 are deformed and disengaged from the gaps 136 of the bottom wall 130.

If desired, the information appliance 10 is detached from the pivot base 30, and is rotated 90 degrees. The information appliance 10 is then horizontally attached to the wall 50. In the preferred embodiment, the attachment of the information appliance 10 can be switched in four different orientations.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. An information appliance assembly comprising:
   an information appliance comprising a bottom wall which defines a recess therein; and
   a pivot base with one end being received in the recess and one opposite end for being attached to a wall, a plurality of spaced projecting portions being formed around the pivot base, wherein the projecting portions are at least partly switchably engaged in the recess;
   wherein a recessed panel is formed with the bottom wall of the information appliance, the recess is defined between the bottom wall and the recessed panel, the recessed panel comprises a plurality of protrusions corresponding to the projecting portions.

2. The information appliance assembly as claimed in claim 1, wherein a plurality of connecting members connects between the recessed panel and the bottom wall of the information appliance, a gap is defined between each of the protrusions and the bottom wall, and the projecting portions engage in the gaps respectively.

3. The information appliance assembly as claimed in claim 2, wherein each of the projecting portions of the pivot base comprises at least one tooth engaging in a corresponding gap of the information appliance.

4. The information appliance assembly as claimed in claim 3, wherein said at least one tooth is slantingly formed for facilitating engagement in the recess of the information appliance.

5. The information appliance assembly as claimed in claim 1, wherein the pivot base comprises a cylinder portion, and a through hole is defined in the cylinder portion.

6. The information appliance assembly as claimed in claim 5, wherein a plurality of slots is defined in the cylinder portion, for providing flexibility to the pivot base.

7. The information appliance assembly as claimed in claim 5, further comprises a fastener extending through the through hole of the pivot base, for attaching the pivot base to the wall.

8. The information appliance assembly as claimed in claim 7, wherein the fastener is a screw.

9. An information appliance assembly comprising:
   an information appliance defining a recess in a bottom wall thereof, the recess comprising a plurality of spaced indents in the bottom wall;
   a pivot base tightly engaging in the recess, the pivot base having at least one tooth projecting therefrom and switchably engaging in the indents of the bottom wall; and
   a fastener for attaching the pivot base to a support;
   wherein the pivot base comprises a cylinder portion, a hole is defined in the cylinder portion corresponding to fastener, at least one slot is defined in the cylinder portion, for providing flexibility to the pivot base.

10. The information appliance assembly as claimed in claim 9, wherein a plurality of teeth is formed on the pivot base corresponding to the indents of the information appliance.

11. The information appliance assembly as claimed in claim 9, wherein a plurality of spaced projecting portions is formed on the pivot base, each of the projecting portions comprises at least one said tooth.

12. The information appliance assembly as claimed in claim 11, wherein a recessed panel is integrated with the bottom wall, and the recess is defined between the bottom wall and the recessed panel.

13. The information appliance assembly as claimed in claim 12, wherein a plurality of connecting members integrally connects between the recessed panel and the bottom wall of the information appliance, the recessed panel comprises a plurality of protrusions, a gap is defined between each protrusion and the bottom wall, and at least one said tooth selectively engage in the gaps respectively.

14. An information appliance assembly comprising:
   an information appliance comprising a face which defines a tubular recess therein; and
   a pivot base with one end being received in the recess and one opposite end for being attached to a support, a plurality of spaced projecting portions being formed around the pivot base and ranged along an axial direction with a distance much larger than that of the recess, wherein the recess is selectively receivably engaged with the different projecting portions to determine different relative angle between the axial direction of the pivot base and that of the recess;
   wherein at least one slot is defined in the pivot base in a direction generally perpendicular to the axial direction.

15. The information appliance assembly as claimed in claim 14, wherein a pin type fastener extends through a center of the pivot base along the axial direction thereof to fasten the pivot base to the support.

16. The information appliance assembly as claimed in claim 15, wherein said fastener reinforces structures of the pivot base.

17. The information appliance assembly as claimed in claim 14, wherein a through hole is defined in the pivot base along the axial direction, the at least one slot communicates with the through hole.

18. The information appliance assembly as claimed in claim 14, wherein the recess has a crossed shape so that the information appliance is capable of being fixed at four different angles relative to the axial direction of the pivot base.

* * * * *